United States Patent
Nakayama et al.

(10) Patent No.: US 9,718,497 B2
(45) Date of Patent: Aug. 1, 2017

(54) VEHICLE BODY SIDE REINFORCEMENT MEMBERS AND VEHICLES INCORPORATING THE SAME

(71) Applicant: Toyota Motor Engineering & Manufacturing North America, Inc., Erlanger, KY (US)

(72) Inventors: David T. Nakayama, Canton, MI (US); Corinne Uskali, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 91 days.

(21) Appl. No.: 14/681,306

(22) Filed: Apr. 8, 2015

(65) Prior Publication Data
US 2016/0297480 A1 Oct. 13, 2016

(51) Int. Cl.
*B62D 25/06* (2006.01)
*B62D 21/15* (2006.01)
*B60J 5/06* (2006.01)
*B62D 25/04* (2006.01)
*B62D 27/02* (2006.01)
*B60J 5/04* (2006.01)

(52) U.S. Cl.
CPC .......... *B62D 21/157* (2013.01); *B60J 5/0458* (2013.01); *B60J 5/06* (2013.01); *B62D 25/04* (2013.01); *B62D 25/06* (2013.01); *B62D 27/023* (2013.01)

(58) Field of Classification Search
CPC ................................. B62D 25/04; B62D 25/06
USPC ............ 296/187.12, 187.13, 193.05, 193.06, 296/185.1, 203.01, 203.03, 210, 104, 155
See application file for complete search history.

(56) References Cited

U.S. PATENT DOCUMENTS 4,544,198 A * 10/1985 Ochiai ................... B60J 5/0479
296/155
5,681,076 A   10/1997 Yoshi
6,299,241 B1 * 10/2001 Heya ...................... B62D 25/06
296/155
(Continued)

FOREIGN PATENT DOCUMENTS

JP 59034924 A * 2/1984
JP 61139516 A * 6/1986
(Continued)

OTHER PUBLICATIONS

Machine translation of JP reference 2008201195 (JP 195).*

*Primary Examiner* — H Gutman
(74) *Attorney, Agent, or Firm* — Dinsmore & Shohl LLP (57) ABSTRACT

A vehicle includes a body framework including a side roof rail structure that extends in a vehicle longitudinal direction that includes a slide rail portion including an upper slide rail channel panel and a lower slide rail channel panel connected to the upper slide rail channel panel forming a slide rail channel for receiving a slide door assembly. The side roof rail structure includes a side roof reinforcement portion including a rail reinforcement panel that is connected to the upper slide rail channel panel providing a space there between. A cross support member extends in a vehicle lateral direction toward the side roof rail. A vehicle side reinforcement member is located in the space and is connected at an inboard end to the cross support member and at an outboard end to the rail reinforcement panel.

18 Claims, 5 Drawing Sheets

(56) References Cited

U.S. PATENT DOCUMENTS

| | | | | |
|---|---|---|---|---|
| 6,976,730 B2* | 12/2005 | Mally | ................... | B62D 25/06 296/203.03 |
| 7,121,615 B2* | 10/2006 | Hoshino | ............... | B62D 25/06 296/187.12 |
| 7,213,874 B2* | 5/2007 | Osterberg | ............. | B62D 25/06 296/203.03 |
| 7,267,395 B2* | 9/2007 | Tomozawa | ............ | B62D 25/06 296/203.01 |
| 7,328,918 B2* | 2/2008 | Hirotani | ............... | B60R 22/023 280/803 |
| 7,357,448 B2* | 4/2008 | Chen | ..................... | B62D 25/04 296/187.12 |
| 7,407,222 B2* | 8/2008 | Anderson | .............. | B62D 25/06 296/193.05 |
| 8,011,719 B2 | 9/2011 | Walter et al. | | |
| 8,662,573 B2 | 3/2014 | Vantrease et al. | | |
| 8,740,290 B2 | 6/2014 | Takayama et al. | | |
| 9,162,711 B2* | 10/2015 | Yasukata | ............... | B62D 25/04 |
| 9,248,863 B2* | 2/2016 | Matsuura | ............... | B62D 25/06 |
| 2003/0085593 A1* | 5/2003 | Shuto | ................... | B62D 25/02 296/203.01 |
| 2009/0174220 A1 | 7/2009 | Guo | | |
| 2013/0234473 A1* | 9/2013 | Lange | ................... | B62D 25/06 296/205 |

FOREIGN PATENT DOCUMENTS

| | | | |
|---|---|---|---|
| JP | 2008201195 A | * | 9/2008 |
| JP | 2008247189 | | 10/2008 |

\* cited by examiner

VEHICLE BODY SIDE REINFORCEMENT MEMBERS AND VEHICLES INCORPORATING THE SAME

TECHNICAL FIELD

The present specification generally relates to reinforcements for vehicles, and more specifically, to a vehicle body side reinforcement member.

BACKGROUND

Automotive vehicle bodies may include a variety of structures that provide strength and rigidity to the vehicle in the event of an impact to the vehicle. The underlying structure is generally comprised of a series of sheet metal structures which are joined to create the vehicle body.

In the roof structure of a vehicle, a cross support member is typically provided beneath a roof panel to both support the roof panel and provide lateral support. The cross support member is generally positioned at a point near or coinciding with the B-pillars of the body framework, whether that body framework is a unibody construction or a frame on chassis construction. The B-pillars are generally upright support structures connected to side roof rails, the latter of which extend longitudinally relative to the vehicle.

When a vehicle is impacted from the side, the cross support member transfers the energy of the impact from the body structure on the side of impact to the body structure on the opposing side of the vehicle. By transferring this energy, the rigidity and strength of the body framework on the impacted side of the vehicle can be improved.

Accordingly, a need exists for alternative structures for transferring energy and absorbing energy from side impacts.

SUMMARY

In one embodiment, a vehicle includes a body framework including a side roof rail structure that extends in a vehicle longitudinal direction that includes a slide rail portion including an upper slide rail channel panel and a lower slide rail channel panel connected to the upper slide rail channel panel forming a slide rail channel for receiving a slide door assembly. The slide roof rail structure includes a side roof reinforcement portion including a rail reinforcement panel that is connected to the upper slide rail channel panel providing a space there between. A cross support member extends in a vehicle lateral direction toward the side roof rail. A vehicle side reinforcement member is located in the space and is connected at an inboard end to the cross support member and at an outboard end to the rail reinforcement panel.

In another embodiment, a vehicle includes a body framework including a side roof rail structure including a slide rail channel for receiving a slide door assembly. A slide door assembly is moveably connected within the slide rail channel to a door roller track structure. A cross support member extends in a vehicle lateral direction toward the side roof rail. A vehicle side reinforcement member is connected at an inboard end to the cross support member. The vehicle side reinforcement extends in a vehicle lateral direction from the cross support member outboard of the door roller track structure.

In another embodiment, a method of reinforcing a side roof rail structure of a vehicle is provided. A body framework is provided that includes a side roof rail structure extending in a vehicle longitudinal direction that includes a slide rail portion including an upper slide rail channel panel and a lower slide rail channel panel connected to the upper slide rail channel panel forming a slide rail channel for receiving a slide door assembly. The slide roof rail structure includes a rail reinforcement panel that is connected to the upper slide rail channel panel providing a space therebetween. A cross support member is positioned to extend in a vehicle lateral direction toward the side roof rail. A vehicle side reinforcement member is located in the space. An inboard end of the vehicle side reinforcement member is connected to the cross support member. An outboard end of the vehicle side reinforcement member is connected to the rail reinforcement panel.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a body framework structure having a sliding door assembly located at a side of the vehicles. The sliding door assembly is located generally rearward of a B-pillar in a vehicle longitudinal direction and slides along a roof side rail structure within a slide rail channel. A cross support member extends from the B-pillar to another B-pillar in a vehicle lateral direction. A vehicle side reinforcement member is connected to an end of the cross support member and extends into the roof side rail structure to a location outboard of at least a portion of the slide rail channel.

Figure 1:
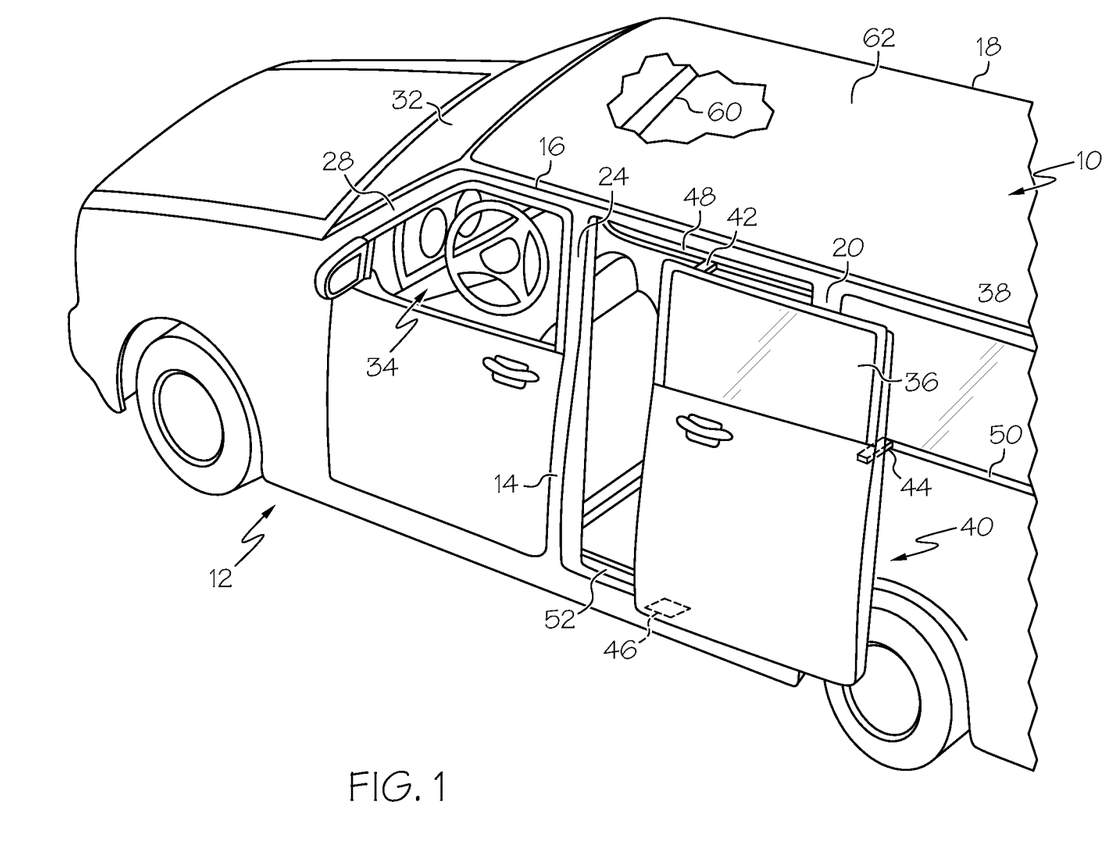
FIG. 1 schematically depicts a perspective view of a vehicle according to one or more embodiments shown or described herein.

Referring to FIG. 1, a vehicle 10 includes a vehicle body 12 including a body framework 14 that includes a pair of side roof rail structures 16 and 18 and various pillars. The various pillars are connected to the side roof rail structures 16 and 18 and extend downwardly therefrom in a vehicle vertical direction. These pillars are generally referred to as the C-pillars 20, the B-pillars 24 and the A-pillars 28. The A-pillars 28 are located toward the forward end of the vehicle 10, generally between a front windshield 32 and front side windows 34. The B-pillars 24 are located generally between the front and rear side windows 34 and 36 of the vehicle 10. Finally, the C-pillars 20 are located between the rear side windows 36 and 38 of the vehicle. Other pillars, such as D-pillars may be located rearward of the C-pillars 20 (e.g., between rear side windows and rear window).

As used herein, directional references (such as inward, inboard, outward, outboard, upward, forward, rearward, etc.) are in relation to the positioning of the components when incorporated into an automotive vehicle. As such, the forward direction is generally towards the front of the vehicle; the inboard or inward direction is generally towards the center line of the vehicle; the outboard or outward direction is generally away from the center line of the vehicle; the upward direction is generally toward the roof of the vehicle; the downward direction is generally toward the ground upon which the vehicle rests; and the rearward direction is generally towards the rear of the vehicle.

Motor vehicles that incorporate elements according to the present disclosure may include a variety of construction methodologies that are conventionally known, including the unibody construction methodology depicted in FIG. 1 as well as a body-on-frame construction methodology. While the embodiments of the present disclosure are described and depicted herein in reference to unibody structures, it should be understood that vehicles that are constructed with body-on-frame construction may incorporate the elements that are shown and described herein. Furthermore, the Figures may only show one side of the vehicle. Descriptions of the other side of the vehicle may be omitted because both sides of the vehicle may be laterally symmetrical and substantially the same.

The vehicle 10 may include a sliding door assembly 40. The vehicle 10 may be any vehicle with a sliding door assembly, such as a minivan or sedan. As shown in FIG. 1, the sliding door assembly 40 is in a partially open position, with a fully open position being where the sliding door assembly 40 is fully slid toward the rear of the vehicle 10. In the embodiment of FIG. 1, the sliding door assembly 40 is connected to the vehicle 10 by an upper hinge 42, a middle hinge 44 and a lower hinge 46. The upper hinge 42 slides in an upper slide rail channel 48 in the vehicle body 12. Similarly, the middle hinge 44 slides in a middle slide rail channel 50 and the lower hinge 46 slides in a lower slide rail channel 52. The sliding door assembly 40 may or may not be a powered sliding door which is capable of opening and closing in response to an input, such as an input received from a key fob or from a door open/close button inside the vehicle 10. In some embodiments, the vehicle 10 may include a sliding door assembly that is manually opened or closed.

Extending between the side roof rail structures 16 and 18 near the B-pillars 24 and 26 is a cross support member 60. As can be seen, the cross support member 60 extends generally laterally along a width of the vehicle 10 and is located below an outer roof panel 62. As will be described in greater detail below, the cross support member 60 provides a support structure for one or more side reinforcement members 66 that are used to reinforce one or both of the side roof rail structures 16 and 18 in the presence of the sliding door assembly 40.

Figure 2:
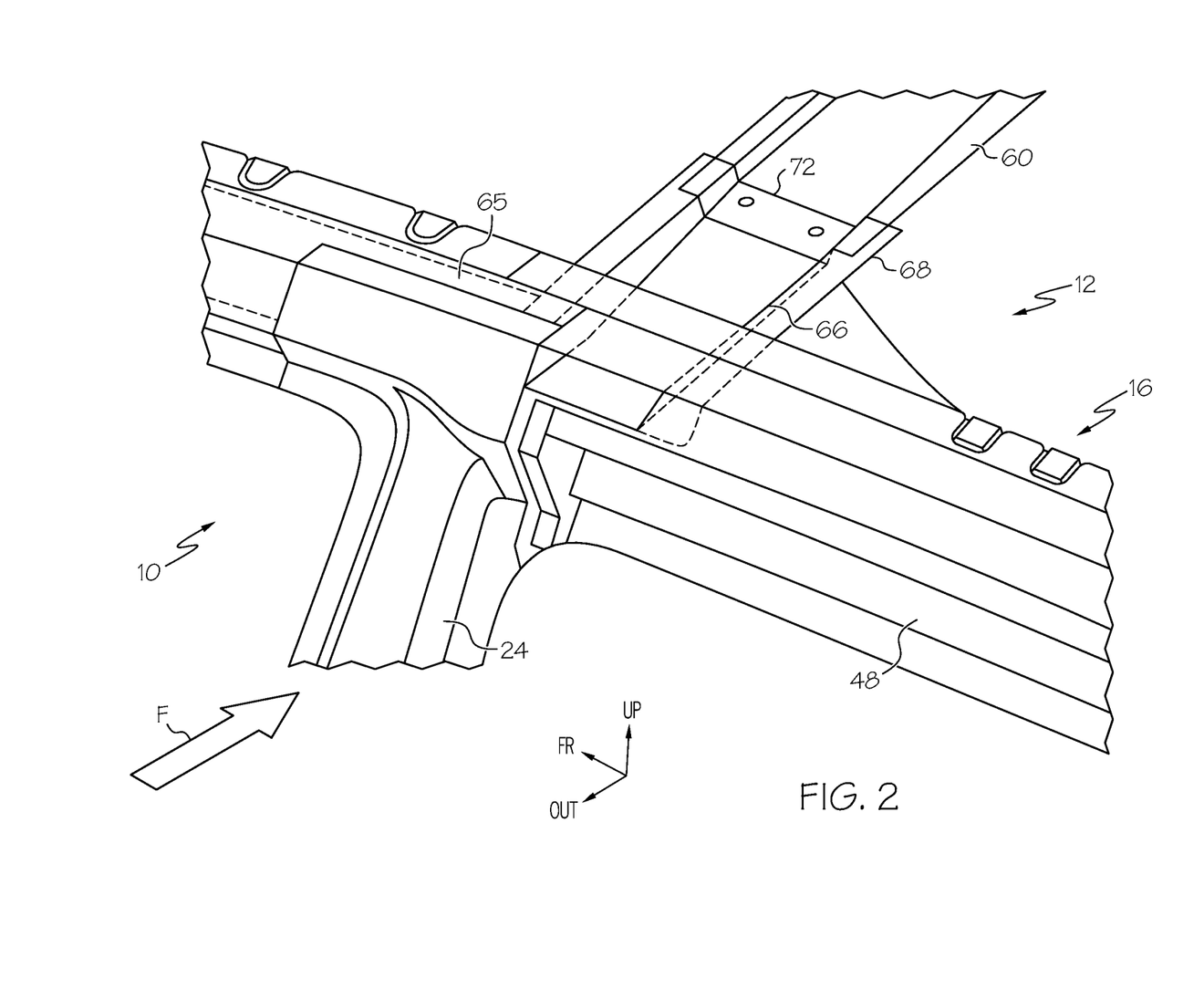
FIG. 2 illustrates a top, partial view of a body framework of the vehicle of FIG. 1 including a vehicle side reinforcement member according to one or more embodiments shown or described herein.

Referring to FIG. 2, the vehicle body 12 is illustrated with various panels and the sliding door assembly 40 removed for clarity. The side roof rail structure 16 extends lengthwise along the roof of the vehicle 10, over the B-pillar 24. The side roof rail structure 16 includes the upper slide rail channel 48 extending longitudinally along the side roof rail structure at a location rearward of the B-pillar 24. The B-pillar 24 may be attached to an outside surface 65 of the side roof rail structure 16 using any suitable method, such as fasteners, welding, structural adhesives, etc. The cross support member 60 extends toward the side roof rail structure 16 generally orthogonal thereto. The cross support member 60 may be centered rearward of the B-pillar 24 to be aligned with a portion of the upper slide rail channel 48.

A vehicle side reinforcement member 66 extends outboard of the cross support member 60 to the side roof rail structure 16. The vehicle side reinforcement member 66 has an inboard end 68 that is connected to an end 72 of the cross support member 60 and an outboard end 70 that is connected to the side roof rail structure 16. As can be seen, the vehicle side reinforcement member 66 extends continuously from the end 72 of the cross support member 60 to the side roof rail structure 16 and has a cross-sectional shape that cooperates with the cross-sectional shape of the cross support member 60 that allows mating (e.g., nesting) of the cross support member 60 with the vehicle side reinforcement member 66.

Figure 3:
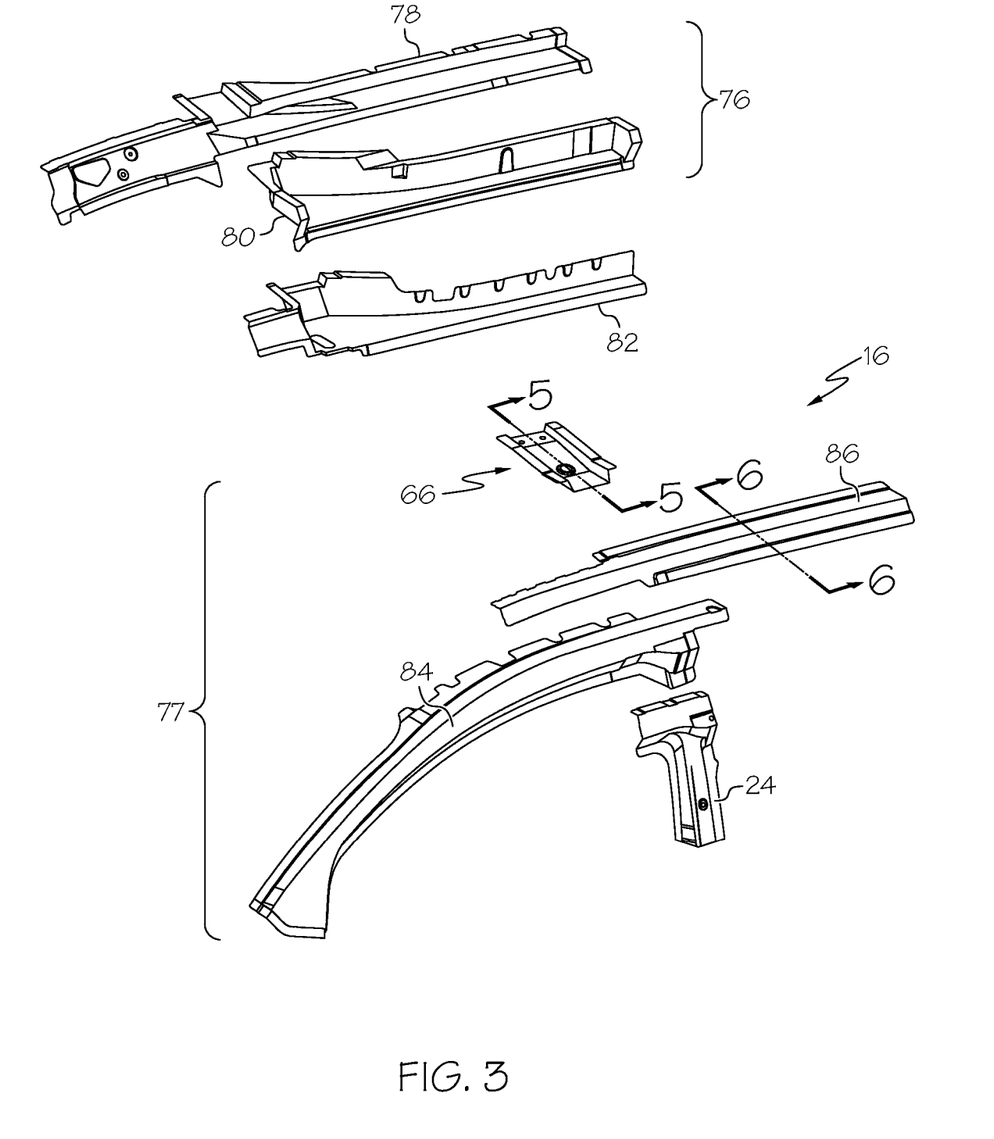
FIG. 3 illustrates an exploded view of the body framework of FIG. 2 including the vehicle side reinforcement member according to one or more embodiments shown or described herein.
Figure 5:
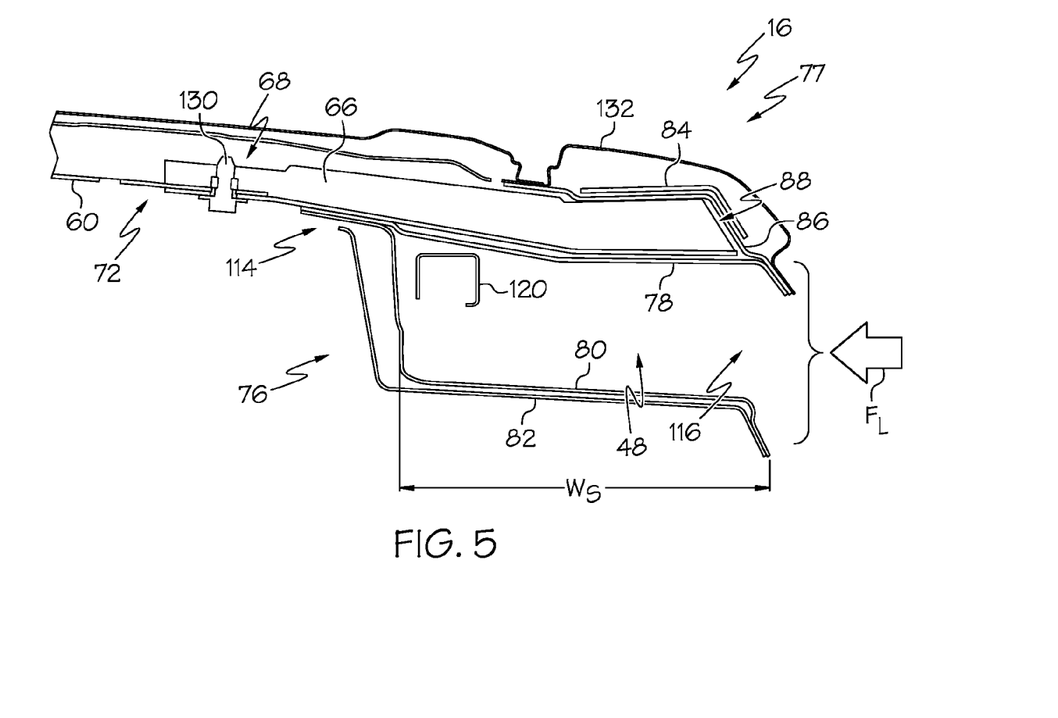
FIG. 5 is a side, section view of a side roof rail structure including the vehicle side reinforcement member along line 5-5 of FIG. 3 in an assembled configuration according to one or more embodiments described herein.

FIG. 3 illustrates the side roof rail structure 16 along with the vehicle side reinforcement member 66 and B-pillar 24 (B-pillar outer reinforcement) in an exploded view. The side roof rail structure 16 includes a slide rail portion 76 and a side roof reinforcement portion 77. The slide rail portion 76 includes an upper slide rail channel panel 78 and a lower slide rail channel panel 80 that connects to the upper slide rail channel panel 78 thereby forming the upper slide rail channel 48 (FIG. 5). A slide rail inner panel 82 can be connected to the lower slide rail channel panel 80 to form an inner or lower surface for the side roof rail structure 16. The side roof reinforcement portion 77 includes an outer rail reinforcement panel 84 and an inner rail reinforcement panel 86. The inner reinforcement panel 86 nests within the outer rail reinforcement panel 84 and attach to the upper slide rail channel panel 78 thereby providing a space 88 (FIG. 5) therebetween to receive the vehicle side reinforcement member 66.

Figure 4:
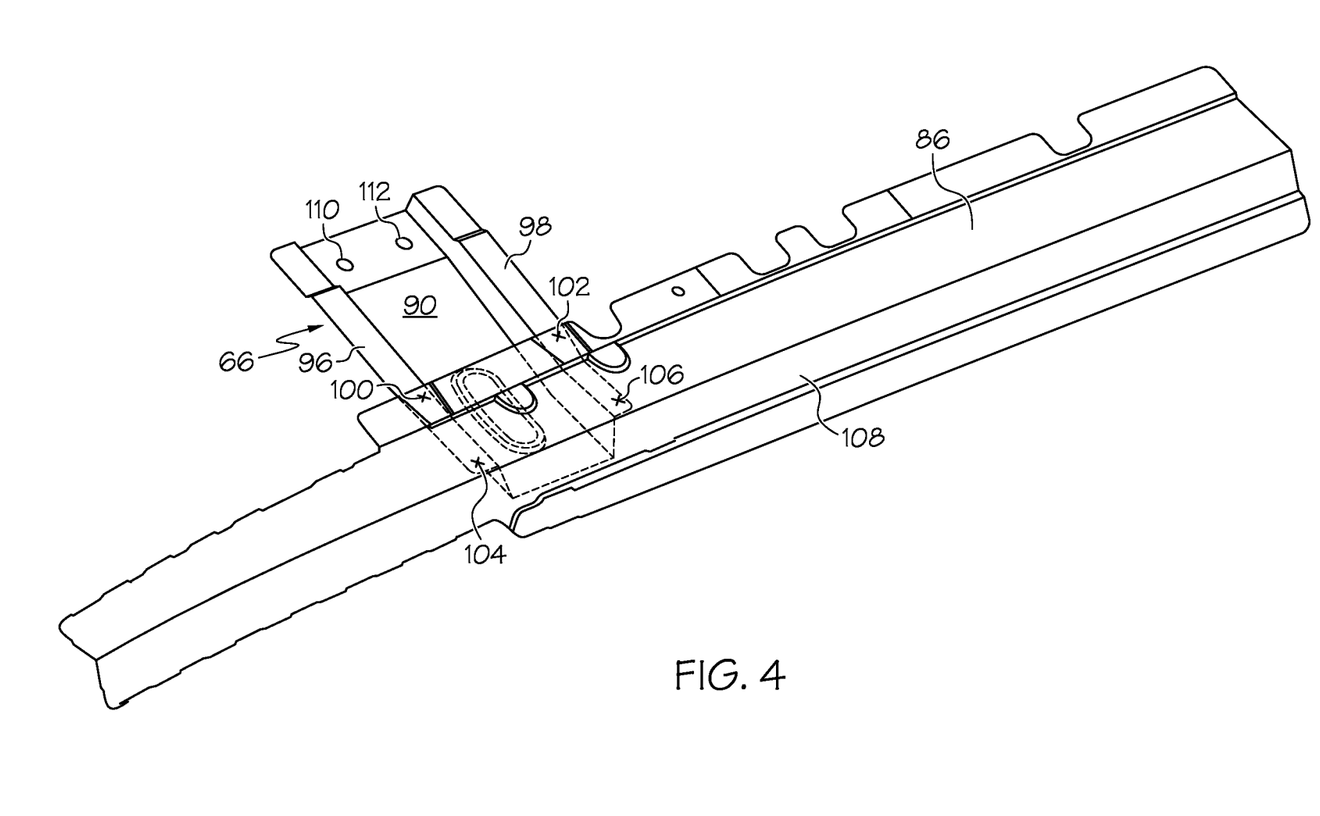
FIG. 4 illustrates a top, perspective view of the vehicle side reinforcement member connected to an inner rail reinforcement member according to one or more embodiments shown or described herein.

Referring briefly to FIG. 4, the vehicle side reinforcement member 66 is a somewhat inverted hat shape in cross section and includes a bottom wall 90 and a pair of side walls 92 and 94 that extend outwardly and integrally from the bottom wall 90. Extending outwardly away from the bottom wall 90 is a pair of support flanges 96 and 98. The support flanges 96 and 98 may be used to connect the vehicle side reinforcement member 66 to the inner rail reinforcement panel 86 by welds 100, 102, 104 and 106. As can be seen by FIG. 4, the welds 104 and 106 are located near an outboard side 108 of the inner rail reinforcement panel 86. Connecting locations 110 and 112 are provided as openings for fasteners to connect the vehicle side reinforcement member 66 to the cross support member 60 (FIG. 5).

Referring now to FIG. 5, the side roof rail structure 16 includes the slide rail portion 76 and the side roof reinforcement portion 77. The slide rail portion 76 includes the upper slide rail channel panel 78 and the lower slide rail channel panel 80 connected thereto at connecting flange portion 114. The slide rail channel 48 is formed between the upper slide rail channel panel 78 and the lower slide rail channel panel 80 to an open end 116 through which a slide arm 118 (FIG.

Figure 6:
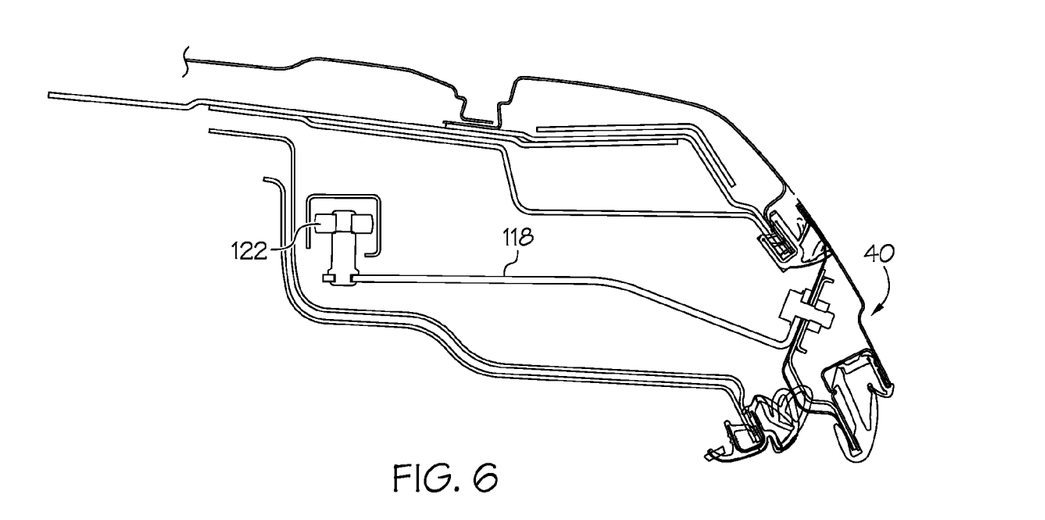
FIG. 6 is another side section view of the side roof rail structure along line 6-6 of FIG. 3 in an assembled configuration according to one or more embodiments shown or described herein.

6) of the sliding door assembly 40 extends. The slide rail inner panel 82 can be connected to the lower slide rail channel panel 80. The side roof reinforcement portion 77 overhangs the slide rail channel 48 and extends beyond a door roller track structure 120 recessed into the slide rail channel 48 and arranged and configured to receive rollers 122 (FIG. 6) of the sliding door assembly 40. The side roof reinforcement portion 77 includes the outer rail reinforcement panel 84 and the inner rail reinforcement panel 86 nested within the outer rail reinforcement panel 84. Exterior of the outer rail reinforcement panel 84 is a skin or outer panel 132 of the vehicle 10.

The vehicle side reinforcement member 66 is connected to the cross support member 60 that extends between the side roof rail structures 16 and 18 (FIG. 1). The inboard end 68 of the vehicle side reinforcement member 66 is connected to the end 72 of the cross support member 60 by any suitable method, such as the fasteners 130, welding, etc. The vehicle side reinforcement member 66 extends continuously from the cross support member 60 to the inner rail reinforcement panel 86 and is welded thereto as described above. The vehicle side reinforcement member 66 can extend laterally over and beyond the door roller track structure 120 to the inner rail reinforcement panel 86. In some embodiments, the vehicle side reinforcement member 66 extends along at least about 25 percent of a maximum width $W_S$ of the slide rail channel 48 measured from its most inboard position to the open end 116 or more, such as about 50 percent or more, such as about 75 percent or more, such as about 90 percent or more.

When an impact object impacts a side of the vehicle, various vehicle structures may elastically and plastically deform to absorb energy. The vehicle structures can divert and absorb the energy associated with the moving vehicle into energy that deforms the vehicle structures. The vehicle structures may be designed to accommodate the introduction of the energy of the impact, such that the energy associated with the impact may be controllably dissipated and directed through selective and preferential deformation of the vehicle structures.

The side of the vehicle may impact an object or vice versa in what is referred to herein as a side impact. In a side impact, the impact occurs at a side portion of the vehicle. For example, various side impact tests may be used where a vehicle-like barrier hits the driver side of the vehicle at a predetermined speed. In such impacts, the energy that is introduced to the vehicle structures may be primarily from the side of the vehicle where relatively little space is provided to absorb energy.

Referring briefly to FIG. 2, the B-pillar 24 may be loaded directly by a lateral force F, for example, during a side impact test. A force may be transferred to the side roof rail structure 16, bypassing a side member outer panel 132, by virtue of the connection between the B-pillar 24 and the side roof rail structure 16. As shown in FIG. 5, when the lateral force $F_L$ is applied to the side roof rail structure 16 by virtue of the laterally loaded the B-pillar 24, the force $F_L$ passes through the relatively rigid outer rail reinforcement panel 84 and the inner rail reinforcement panel 86 to the vehicle side reinforcement member 66 before little to no deflection of the inner rail reinforcement panel 86. The vehicle side reinforcement member 66 provides a direct load path from the inner rail reinforcement panel 86 to the cross support member 60.

The above-described vehicle side reinforcement members can provide a more direct load path from the side roof rail structures directly to the cross support member. The vehicle side reinforcement members may extend outwardly from the cross support member in the vehicle lateral direction, over the slide rail channel and be connected directly to the inner rail reinforcement panel, which is located at the outboard end of the side roof rail structures. Such an arrangement can more efficiently transfer load to the cross support member in early stages of side roof rail structure deformation.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
    a body framework comprising a side roof rail structure extending in a vehicle longitudinal direction that includes a slide rail portion comprising an upper slide rail channel panel and a lower slide rail channel panel connected to the upper slide rail channel panel forming a slide rail channel for receiving a slide door assembly, the side roof rail structure including a side roof reinforcement portion including a rail reinforcement panel connected to the upper slide rail channel panel at a location outboard of a side reinforcement member and providing a space therebetween;
    a cross support member that extends in a vehicle lateral direction toward the side roof rail; and
    the vehicle side reinforcement member is located in the space and connected at an inboard end to the cross support member and at an outboard end to the rail reinforcement panel that extends in the vehicle lateral direction over and beyond a door roller track structure to the rail reinforcement panel.

2. The vehicle of claim 1, wherein the body framework comprises a first pillar connected to the side roof rail structure located between a front windshield location and a front side window location and a second pillar connected to the side roof rail structure located between the front side window location and a rear side window location.

3. The vehicle of claim 2, wherein the vehicle side reinforcement member is located at the second pillar.

4. The vehicle of claim 2, wherein the slide rail channel extends along the side roof rail structure in a vehicle longitudinal direction rearward away from the second pillar.

5. The vehicle of claim 1 further comprising the door roller track structure located in the slide rail channel, the door roller track structure configured to receive rollers of a sliding door assembly.

6. The vehicle of claim 1, wherein the vehicle side reinforcement member is welded to the rail reinforcement panel.

7. The vehicle of claim 1, wherein the vehicle side reinforcement member extends along at least 50 percent of a width of the slide rail channel measured in the vehicle lateral direction.

8. A vehicle comprising:
a body framework comprising a side roof rail structure comprising a slide rail channel including an upper slide rail channel panel and a lower slide rail channel panel for receiving a slide door assembly;
the slide door assembly moveably connected within the slide rail channel to a door roller track structure;
a rail reinforcement panel connected to the upper slide rail channel panel;
a cross support member that extends in a vehicle lateral direction toward the side roof rail; and
a vehicle side reinforcement member connected at an inboard end to the cross support member, the vehicle side reinforcement member extending from the cross support member, in the vehicle lateral direction over and beyond the door roller track structure, to the outboard of the door roller track structure;
wherein the rail reinforcement panel is connected to the upper slide rail channel panel at a location outboard of the side reinforcement member.

9. The vehicle of claim 8, wherein the body framework comprises a first pillar connected to the side roof rail structure located between a front windshield location and a front side window location and a second pillar connected to the side roof rail structure located between the front side window location and a rear side window location.

10. The vehicle of claim 9, wherein the vehicle side reinforcement member is located at the second pillar.

11. The vehicle of claim 9, wherein the slide rail channel extends along the side roof rail structure in a vehicle longitudinal direction rearward away from the second pillar.

12. The vehicle of claim 8, wherein the vehicle side reinforcement member is welded to the rail reinforcement panel.

13. The vehicle of claim 8, wherein the vehicle side reinforcement member extends along at least 50 percent of a width of the slide rail channel measured in the vehicle lateral direction.

14. The vehicle of claim 8, wherein the side roof rail structure includes a slide rail portion comprising an upper slide rail channel panel and a lower slide rail channel panel connected to the upper slide rail channel panel forming the slide rail channel for receiving the slide door assembly, the side roof rail structure including a side roof reinforcement portion including the rail reinforcement panel connected to the upper slide rail channel panel providing a space therebetween, the vehicle side reinforcement member located in the space.

15. A method of reinforcing a side roof rail structure of a vehicle, the method comprising:
providing a body framework comprising a side roof rail structure extending in a vehicle longitudinal direction that includes a slide rail portion comprising an upper slide rail channel panel and a lower slide rail channel panel connected to the upper slide rail channel panel forming a slide rail channel for receiving a slide door assembly, the side roof rail structure including a side roof reinforcement portion including a rail reinforcement panel connected to the upper slide rail channel panel at a location outboard of a vehicle side reinforcement member and providing a space therebetween;
positioning a cross support member to extend in a vehicle lateral direction toward the side roof rail;
locating the vehicle side reinforcement member in the space;
connecting an inboard end of the vehicle side reinforcement member to the cross support member; and
connecting an outboard end of the vehicle side reinforcement member to the rail reinforcement panel, the vehicle side reinforcement member extending in the vehicle lateral direction over and beyond a door roller track structure to the rail reinforcement panel.

16. The method of claim 15, wherein the body framework comprises a first pillar connected to the side roof rail structure located between a front windshield location and a front side window location and a second pillar connected to the side roof rail structure located between the front side window location and a rear side window location.

17. The method of claim 16, wherein the vehicle side reinforcement member is located at the second pillar.

18. The method of claim 15, wherein the door roller track structure is located in the slide rail channel, the door roller track structure configured to receive rollers of a sliding door assembly.

* * * * *